United States Patent Office 2,827,168
Patented Mar. 18, 1958

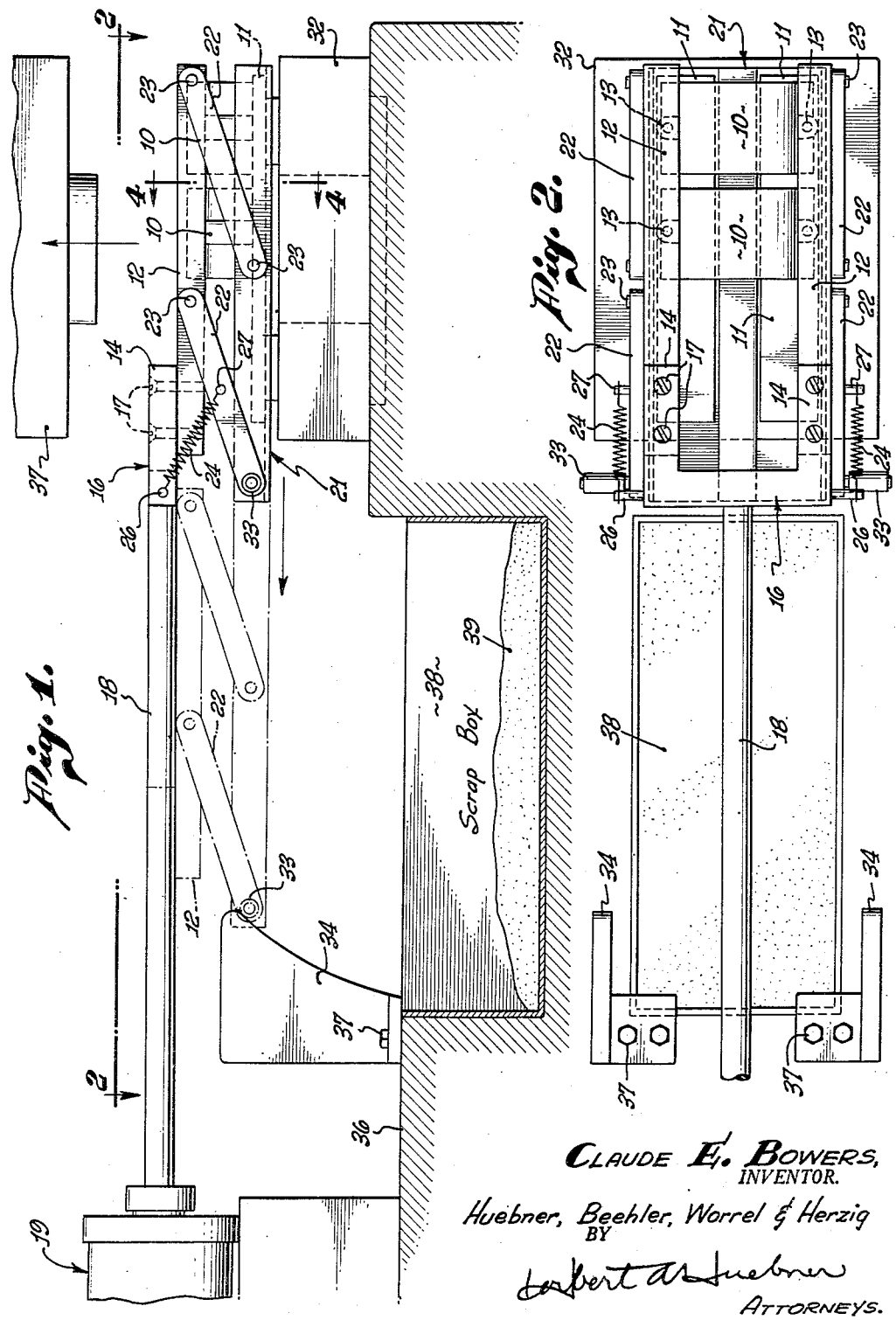

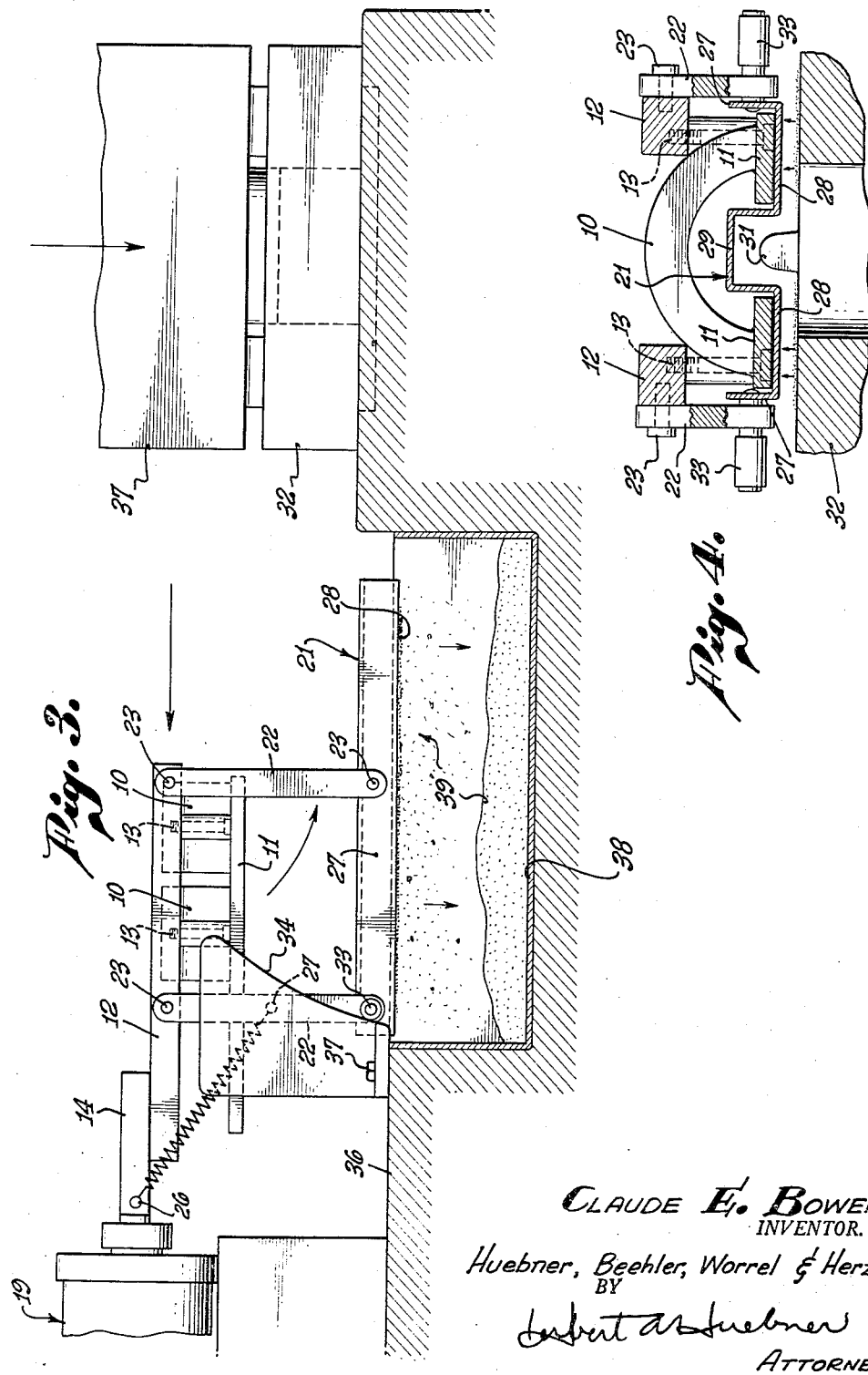

2,827,168

APPARATUS AND METHOD FOR REMOVING SCRAP FROM DIES AND BOXES

Claude E. Bowers, Beverly Hills, Calif., assignor to Bowers Manufacturing Co. Inc., Los Angeles, Calif., a corporation of California Application July 16, 1956, Serial No. 597,966

3 Claims. (Cl. 209—215)

This invention relates to an apparatus and method for magnetically removing scrap metal from a work area, and particularly to such an apparatus and method for removing metal scraps from machinery and work objects in such metal working machines as dies, drills, punches and the like.

In many metal forming, cutting and trimming operations, scraps and bits of metal are produced in and around the machine tools and the work objects. For example, in punching and forming switch boxes for electric switches, bits of metal are formed in the boxes and in the dies. It is difficult to brush this metal from the dies and to empty it from the boxes. Metal shavings and scraps interfere with the machining operations. They also are detrimental to the operator's shoes and the floor covering.

The use of air blasts to blow the metal scraps, turnings and the like from the work objects and the machine work area is relatively dangerous. The air-blown metal scraps and turnings may lodge in the eyes of persons in the neighborhood of the work area and can lead to serious eye injuries. This is especially true in the use of trim dies where relatively sharp scraps of metal are produced.

It is apparent, therefore, that a safe, rapid and inexpensive method that will effectively remove scraps of metal from such working areas is greatly desirable. Furthermore, in some operations, the recovered metal scrap is of significant value for recovery and re-use of the metal in the scraps. In a magnetic scrap removal system the metal scraps are readily collected and recovered at the same time that they are removed from the work area.

Accordingly, it is an important object of my invention to provide an apparatus and method for magnetically removing scraps of metal from a work area without the hazards and inconveniences of blowing the metal scraps from the area.

Another object is to provide such an apparatus and method for magnetically removing scraps of metal from the metal machining or forming area and at the same time efficiently and economically collecting and recovering the scraps.

A further object is to provide such an apparatus and method for safely, rapidly and conveniently removing and recovering scraps and bits of metal from work objects such as switch boxes, and tools and dies employed in their formation and fabrication.

Additional objects will become apparent from the following description.

Stated in general terms, my invention comprehends the provision of an apparatus and method for removal of metal scraps from a work area by the employment of a magnet, or magnets, and a pan, plate or partition means disposed adjacent the magnet or magnets. Means are included for moving the magnet and pan means to and from the work area, for moving the magnet near an inner or upper surface of the pan means to attract scraps of metal from the work area to an outer or under surface of the pan means, for moving the magnet and pan means from the work area, and for spacing the magnet from the inner or upper surface of the pan means sufficiently to cause the metal scraps to drop from the pan means by gravity into a receptacle, such as a scrap recovery box.

The method involved in the invention comprises placing a partition over the work area, placing a magnet over the partition of sufficient strength to attract the scraps to an under surface of the partition, removing the partition with the magnetically attracted scraps from the work area, and spacing the magnet and partition until the scraps fall by gravity from the partition into a recovery receptacle. This cycle of operations is repeated periodically and it can be synchronized with the cutting tool operation to be automatically repetitive.

A more detailed description of a specific embodiment of my invention is given with reference to the drawings, wherein:

Figure 1 is a side elevational view showing an embodiment of the apparatus in position for attracting metal scraps from a die;

Figure 2 is a plan view taken on the line 2—2 of Figure 1;

Figure 3 is a side elevational view similar to that of Figure 1 showing the apparatus removed from the die and dropping the recovered metal scraps into a scrap box; and Figure 4 is a sectional elevational view taken on the line 4—4 of Figure 1.

In the apparatus shown in the drawings, two permanent magnets 10 are employed. Although two magnets are shown, it will be understood that one, or three or more magnets, can be used. Magnets of the horseshoe type, having a pole piece 11 at each end thereof, are shown. It will be understood that bar magnets, or magnets of any other convenient shape can be used. Electromagnets also can be used in the place of permanent magnets.

Two pole pieces 11 are attached to the ends of the magnets. Each pole piece is attached to one end of each of the magnets so that the magnetic attraction of the magnets is concentrated in the common horizontal plane of the pole pieces. The pole pieces 11 in turn are bolted to two horizontal bars 12 by screws 13 having their heads countersunk in the pole pieces and threadedly engaged in tapped holes in the undersides of the bars. The bars at their rear ends are attached to the prongs 14 of a fork 16 by screws 17. A pan plate or partition 21 is connected to bars 12 by links 22. Two links are connected to the side of each bar and to each side of the pan by pivot screws 23 so that the links are freely pivotable around the screws. It will be seen in Figure 3 that when the links are fully extended, the pan is farthest removed from the pole pieces 11. When the links are completely retracted, as shown in Figure 1, the pan is brought in contact with its inner surface engaging the outer surfaces of the pole pieces, as shown in Figure 1.

Each of two coil springs 24 is fastened at one end to a pin 26 on each prong 14 of fork 16, and at the other end to a pin 27 on a rear link 22 on each side of the pan 21. The springs are loaded so as to continuously urge the rear links 22 and pan 21 into the completely retracted position. In this position, the inner surface of the bottom 28 of the pan 21 preferably is in contact with the under surface of pole pieces 11 so that a strong field of magnetism is induced in the plane of the under side of the pan.

The pan 21 is provided with sides 27 turned at right angles to the bottom portions 28. The bottom portions 28 of the pan are in a horizontal plane parallel and closely adjacent to the plane of the lower surfaces of the pole pieces 11. A re-entrant portion 29 is formed longitudinally of the pan 21 to clear a spacer projection 31 on a die 32 when the pan 21 is moved laterally of the die.

Cam followers or rollers 33 are mounted rearwardly on each side of the pan 21 for engagement with a release, i. e. spaced cams 34 when the pan is retracted in the direction of the arrow by a piston rod 18 connected to fork 16. The cam followers 33 near the end of their rearward movement engage the upper portions of the cam surfaces of the cams 34. As their rearward movement continues, the cam followers are urged downward along the cam surfaces and against the tension in springs 24. This causes an extension of the links 22 and separation of pan 21 a maximum distance from the pole pieces 11, as best shown in Figure 3.

The cams 34 are fastened to a support 36 in suitable spaced relation to each other by screws 37. A scrap box 38 is fitted in a recess in support 36 between die 32 and the cams 34. The scrap box is made of somewhat larger dimensions than pan 21 to assure that all of the metal scraps 39 fall into the box when dropped from the pan.

Considerable amounts of scrap metal are produced in punching, shearing, cutting or trimming work objects such as switch boxes and the like. These metal scraps are objectionable and it is desirable to remove them periodically or cyclically at the end of each punching, shearing, drilling or other operation of machinery normally used in metal forming and shaping operations.

For example, after a punch 37 has completed its downward stroke, as shown by the arrow in Figure 3, it is again retracted, as shown by the arrow in Figure 1. While the punch 37 is in its retracted position, compressed air or steam is introduced into a pneumatic piston and cylinder assembly 19 by appropriate valving means to extend the rod 18, as shown in Figure 1. While the rod is being extended, the pan 21 and magnets 10 are moved over the upper surface of die 32 and a work piece, such as a switch box positioned in the die.

During this movement, the pan 21 has its inner or upper surfaces in engagement with the lower surfaces of the pole pieces 11 as a result of the tension in springs 24 retracting the links 22, as described above. The magnetic fields of magnets 10 are sufficiently strong to pass through the bottom of pan 21 and attract metal scraps from the die 32 and switch box work piece in the die. The metal scraps adhere to the under surface or surfaces of the bottom 28 of pan 21 sufficiently to cling thereto in opposition to the force of gravity.

Air or steam then is introduced into the piston and cylinder assembly 19 to cause rod 18 to be retracted into the cylinder in the direction of the arrow. This causes the magnets 10 and pan 21 together with the metal scraps 39 attracted to the bottom of the pan to move to the left with rod 18, as shown in phantom in Figure 1.

As the magnet and pan assembly moves to the left, rollers 33 engage the upper ends of cams 34 and cause the pan to break away and become separated from the under surfaces of pole pieces 11. The links 22 pivot in the counter-clockwise direction, as shown by the arrow in Figure 3. As the pan 21 is separated from the pole pieces 11 of magnets 10, the magnetic fields emanating from the magnets rapidly become weaker and the gravitational pull on the metal scraps 39 becomes sufficient to overcome the forces of magnetic attraction. The metal scraps 39 then fall by gravity, as indicated by the arrows in Figure 3, into scrap box 38 directly beneath the pan 21.

The pan 21 preferably is made of very soft iron to avoid retaining any appreciable amount of residual magnetism, induced therein by the magnets 10. Pan 21 can be made of non-magnetic material, but should be relatively permeable to magnetism so that the magnetic fields from magnets 10 will pass through the bottom of pan 21 sufficiently to attract scraps of metal, as described above.

When it is again desired to recover scraps of metal from the dies and work pieces in die 32, the above-described operation is repeated by again introducing air or steam into piston and cylinder assembly 19 through suitable valve means to again extend piston rod 18 and the magnet and pan assembly above die 32, as described above. If desired, the operation of punch 37 can be synchronized with the operation of cylinder assembly 19 so that piston rod 18 is automatically extended and retracted cyclically each time punch 37 is retracted to its original position.

While I have herein shown and described my invention in what I have conceived to be the most practical and preferred embodiment, it is recognized that departures can be made therefrom within the scope of my invention, which is not to be limited to the details disclosed herein, but is to be accorded the full scope of the claims so as to embrace any and all equivalent structure and operation.

Having described my invention, what I claim as new and desire to secure by Letters Patent is:

1. An apparatus for removal of metal scraps from a work area to a scrap receiving area comprising a magnet, pan means disposed below the magnet with an inner surface thereof facing the magnet, reciprocal means for moving the magnet and pan means back and forth from over the work area to over the scrap area, resilient means for bringing the magnet in contact with the inner surface of the pan means at the work area to attract scraps from the work area to an outer surface of the pan means, and cam means extending upwardly from the scrap area for spacing the magnet from the inner surface of the pan means sufficiently for the scraps to drop from the outer surface of the pan means by gravity when the magnet and pan means are removed from the work area.

2. An apparatus for periodic removal of metal scraps from a work area comprising a magnet, pan means disposed below the magnet with an inner surface thereof facing the magnet, link means connecting the pan means and the magnet for periodic movement of the pan means to and from the magnet, pneumatic piston and cylinder means connected to the magnet and pan means for periodically moving the same to and from the work area, tension spring means for urging the pan means into engagement with the magnet at the work area to attract scraps from the work area to an outer surface of the pan means, cam follower means on the pan means, and cam means for urging the pan means from the magnet against the spring means sufficiently for the scraps to drop from the outer surface of the pan means by gravity when the magnet and pan means are removed from the work area.

3. Apparatus comprising a work area, an area for receiving metal scraps, a magnet member, a pan member positioned under the magnet member, means interconnecting the magnet member and the pan member and urging the members toward interengagement, release means extending upwardly from the scrap area, reciprocal means for moving said members back and forth from over the work area to a position over the scrap area where one of said members engages said release means, and means on said release means and said one member for moving said one member away from the other member through actuation of said reciprocal means, thereby to space the pan member from the magnet member sufficient enough to allow any metal scraps on the undersurface of the pan member and picked up at the work area to drop to the scrap receiving area.

References Cited in the file of this patent

UNITED STATES PATENTS 2,426,795    Sjostrom    Sept. 2, 1947